United States Patent

[11] 3,597,675

| [72] | Inventors | John E. Peek |
| | | Addison; |
| | | Milan Smrcka, Hickory Hills, both of, Ill. |
| [21] | Appl. No. | 823,875 |
| [22] | Filed | May 12, 1969 |
| [45] | Patented | Aug. 3, 1971 |
| [73] | Assignee | Sola Basic Industries, Inc. |
| | | Milwaukee, Wis. |

[54] PULSE WIDTH MODULATED DC POWER SUPPLY
7 Claims, 4 Drawing Figs.

[52] U.S. Cl. .............................. 321/14,
 321/18, 321/19, 323/22
[51] Int. Cl. ............................ H02m 1/08,
 H02h 7/14
[50] Field of Search ...................... 307/283,
 284; 321/16, 18, 19, 14; 323/22 SCR

[56] References Cited
UNITED STATES PATENTS

| 3,305,763 | 2/1967 | Kupferberg et al. | 321/18 X |
| 3,323,035 | 5/1967 | Gately | 321/16 |
| 3,353,080 | 11/1967 | Santelmann | 321/18 X |
| 3,353,082 | 11/1967 | Mellott et al. | 321/16 |
| 3,377,542 | 4/1968 | Glorioso | 323/22 SCR |

Primary Examiner—William H. Beha
Attorney—Smythe & Moore

ABSTRACT: An AC to regulated DC power supply utilizing pulse width modulation wherein the output side of a high leakage reactance transformer or the like is directly connected to a rectifying bridge, a regulating thyristor is serially connected in the output from the bridge, and a capacitor is connected across the output lines of the bridge on the load side of the thyristor. Voltage and/or current regulation is provided by a control circuitry for the thyristor which includes voltage node control of a unijunction timing circuit wherein the timing cycle is controlled by a periodically pulsed SCR.

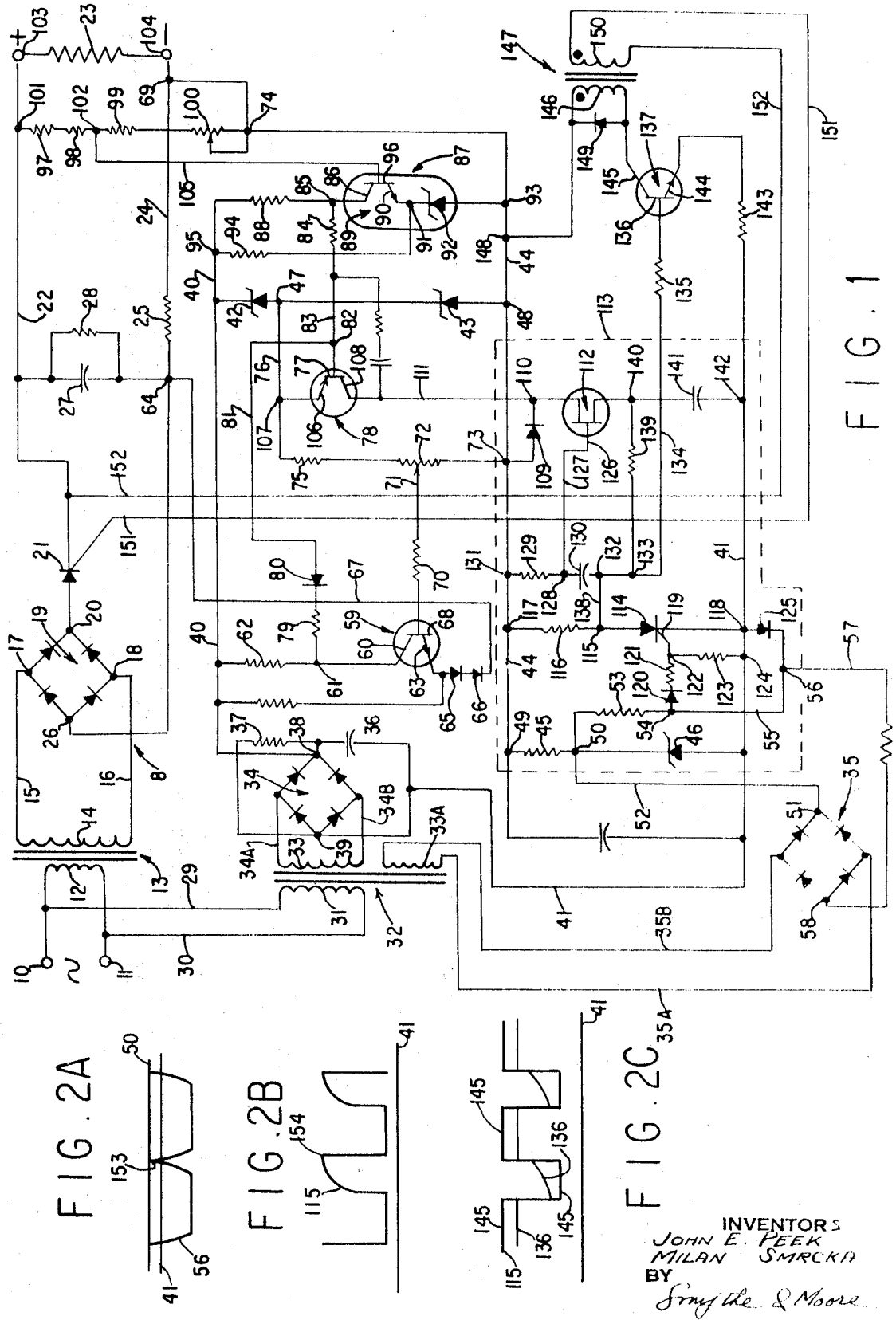

PULSE WIDTH MODULATED DC POWER SUPPLY

This invention relates to regulated DC power suppliers and more particularly to a thyristor regulated DC power supply and circuitry for the control thereof.

Various types of apparatus and circuitry have been proposed, some including thyristors, for converting AC to a regulated DC power supply. The present invention differs from such prior devices by a novel arrangement of conventional elements thereby to provide energy at a metered rate with fewer active and passive components and subsequent greater reliability. It differs by the provision of unique circuitry for the control of the thyristor power regulating switch.

An object of the invention, therefore, is to provide an improved AC to DC thyristor regulated power supply having fewer components and greater reliability than known devices of this type.

A further object is to provide improved reliability and performance in a regulated DC power supply utilizing pulse width modulation techniques at low pulse frequency to effect regulation of voltage and/or current.

A further object is the provision of a thyristor controlled DC power supply in which the inductance of a high reactance transformer or the like in conjunction with a filter capacitor effect positive commutation of the thyristor following energy transfer.

A further object is the provision of a thyristor regulated power supply in which new and improved timing circuitry effects a more accurate and reliable control of the power regulating thyristor.

A further object is to provide new and improved pulse timing circuitry for triggering a thyristor power switch or the like.

A further object is the provision of thyristor control circuitry which is responsive to linear rather than exponential control signals.

A further object is the provision of a unijunction type of pulse timing circuitry wherein a reset signal assures accurate and precise starting of each timing period and prevents misfiring of the unijunction.

A further object is to provide a thyristor controlled power supply in which the pulse generating means for firing the thyristor is electrically isolated from but controlled by a unijunction timing circuit utilizing base voltage control for the unijunction.

In one aspect of the invention, a high leakage reactance transformer adapted to be connected to an AC source of power has its secondary directly connected to a full wave rectifying bridge having a pair of load lines connected to the DC output terminals thereof. A thyristor power switch is serially connected in one of the load lines and a filter capacitor is connected across the load lines on the load side of the thyristor. Voltage and/or current regulation is obtained by a control circuitry which controls the firing angle of the thyristor power switch, i.e., the pulse width of energy transferred by the thyristor to the filter capacitor and load during each half cycle of the AC supply voltage. The control circuitry includes a voltage sensing amplifier comprising a transistor amplifier and reference voltage source, a current-sensing amplifier having an adjustable set or turn-on point, and an OR gate amplifier for transferring control signals from the voltage and current sensors to a unijunction timing circuit utilizing voltage node control of the unijunction. Bias and control voltages for the control circuitry and pulsating DC voltage for the timing circuit are provided by a second transformer having a primary connected to the AC input and two secondaries, one connected to a full wave rectifying bridge having a filtered DC output, and the second to a full wave bridge having an unfiltered output to provide the pulsating DC voltage. The timing circuit comprises an SCR which is periodically triggered by the pulsating DC a capacitor which is charged through a series resistance at a fixed charging rate depending upon the RC time constant when the SCR fires, and a unijunction transistor having its emitter connected to the capacitor and one of its bases to a fixed voltage. The potential of the other base is determined by the amplified signals produced by the voltage and/or current sensors through the OR gate amplifier whereby the firing point of the unijunction depends upon the difference of potential between the bases to effect voltage node control. Firing of the unijunction triggers the thyristor power switch through an isolating transistor driver and a pulse transformer.

The above and other objects, advantages and features of the invention will be apparent from the following description taken in conjunction with the accompanying drawing which illustrates an exemplary embodiment of the invention.

In the drawing:

FIG. 1 is a schematic wiring diagram of the regulator of the present invention; and FIGS. 2a, 2b and 2c illustrate the voltage potentials which exist at various points in the circuitry system of FIG. 1.

Referring to FIG. 1, there is shown the terminals 10 and 11 which are adapted to be connected to any desired source of AC power and are connected to the primary 12 of a high-leakage reactance transformer 13. The secondary 14 of transformer 13 is connected by lines 15 and 16 to junctions 17 and 18 of a rectifying bridge 19. Junction 20 of the bridge 19 is connected through a thyristor such as a silicon controlled rectifier (SCR) 21 by line 22 to a load 23, the other side of the load being connected through line 24 and resistor 25 to the junction 26 of bridge 19. A C-R network comprising filter capacitor 27 and a preload shunt resistor 28 is connected across the lines 22 and 24 between the SCR 21 and the load 23.

For controlling the thyristor or SCR 21, lines 29 and 30 connect the terminals 10 and 11 with the primary 31 of a transformer 32 having secondary windings 33 and 33A connected to rectifying bridges 34 and 35 by lines 34A and 34B and lines 35A and 35B, respectively. The output of bridge 34 is filtered by a capacitor 36 and a resistance 37 which are connected across the output terminals 38 and 39 of the bridge to provide a substantially constant DC supply or biasing voltage across the lines 40 and 41. The lines 40 and 41 are connected together by Zener diodes 42 and 43, line 44, resistance 45, and Zener 46 thereby establishing voltage potentials or nodes at the points (junctions) 47, 48, 49 and 50. The bridge 35 provides a pulsating DC output which is fed to a circuit comprising the terminal 51, line 52, junction 50, resistance 53, junction 54, line 55, junction 56, line 57 and terminal 58.

Referring now to the portion of the circuit contained between the lines 40 and 41, there is shown a NPN transistor 59 having its collector 60 connected to the line 40 through junction 61 and resistance 62 and its emitter 63 connected to a junction 64 on a line 24 through diodes 65 and 66 and line 67. The base 68 of transistor 59 is connected to junction 69 on line 24 through resistance 70, arm 71 of potentiometer 72, junction 73, line 44 and junction 74. The emitter 63 and base 68 of transistor 59 are thus connected across load series resistance 25 whereby the transistor 59 operates as a load current sensor and amplifier having a threshold or cut-on point dependent upon the setting of potentiometer 72, the upper end of the potentiometer being connected through a resistance 75 and line 76 to the junction or voltage reference point 47 between the Zeners 42 and 43.

Output signals from the transistor-amplifier 59 are transferred from the junction 61 to the base 77 of a transistor amplifier 78 by means of a resistance 79, diode 80, line 81 and junction 82. The base 77 of transistor 78 is also connected through a line 83, resistance 84 and junction 85 to the output collector 86 of a transistor-reference amplifier 87, the collector 86 being also connected through a resistance 88 to the line 40. The transistor-reference amplifier 87 is a unitary device comprising a transistor 89 having its emitter 90 connected through a junction 91 to the cathode of a Zener diode 92. The anode of Zener 92 is connected to line 44 at point 93 while the junction 91 is connected through a resistance 94 to the line 40 at point 95. The emitter 90 is thus maintained at a fixed reference potential with respect to the collector 86 and base 96 of transistor 89.

A plurality of series connecting dropping resistances 97, 98, 99 and a potentiometer 100 are connected across the load lines 22 and 24 at points 101 and 69 to provide a potential at a point 102 which is proportional to the output voltage at load terminals 103 and 104. This potential is applied to the base 96 of transistor 89 by means of a line 105 connecting junction or point 102 to the base 96, thereby controlling the collector current through transistor 89 and the potential at point 85 by virtue of the IR drop through resistance 88. The transistor-reference amplifier 87 thus serves as a voltage sensor providing an error signal at point or junction 85. This signal is transferred through resistance 84 and line 83 to the base 77 of transistor 78.

The emitter 106 of transistor 78 is tied to the voltage node at point 47 through the junction 107 and line 76. The potential or voltage at point or node 110 is thus controlled by the voltage applied to the base 77 of transistor 78. This voltage, in turn, is controlled either by the voltage sensor 87 through point 85 and line 83 or the current sensor 59 through point 61 and line 81, as hereinabove described. The current sensor 59 is primarily an overload or current limiting device, i.e., when the voltage across load resistance 25 reaches a predetermined value depending upon the threshold or cut-on point of transistor 59, the transistor conducts thereby lowering the voltage at point 61 and on the base of transistor 78 to effect a rise in voltage at node or point 110 and reduce the output voltage of the power supply towards zero in a manner hereinafter more fully described. At or about the same time, the drop in voltage at point 102 has turned the transistor 89 off. The transistor amplifier 78 thus acts, in effect, as an OR gate for the outputs of transistors 59 and 89.

The voltage potential at node or point 110 is applied to the B2 (base 2) electrode of a unijunction transistor 112 forming a part of a pulse-timing circuit shown as enclosed within the dashed lines 113. Referring to this circuit, an SCR 114 has its anode connected to the line 44 through a junction 115, resistance 116 and junction 117 and its cathode connected to the line 41 at a junction 118. The gate 119 of SCR 114 is connected to the previously described junction 54 through a diode 120, resistance 121 and junction 122. A resistance 123 is connected between the junction 122 and a junction 124 on the line 41, and a diode 125 is connected between the junctions 118 and 56.

The emitter 126 of unijunction transistor 112 is connected by line 127 to a junction 128 between a resistance 129 and a capacitor 130. The other end of resistance 129 is connected to the line 44 at junction 131 while the other side of capacitor 130 is connected through junctions 132 and 133, line 134 and resistance 135 to the base 136 of a transistor driver 137. The junction 132 is connected by line 138 to the junction 115 while the junction 133 is connected to the B1 (base 1) electrode of unijunction 112 through a resistance 139 and junction 140. A capacitor 141 is connected between the junction 140 and a junction 142 on line 41, and the line 41 leads through a resistance 143 to the emitter 144 of transistor driver 137. The collector 145 of transistor 137 is connected to the line 44 through the primary 146 of a pulse transformer 147 and a junction 148, the primary 146 having a diode 149 connected in shunt therewith. The secondary 150 of transformer 147 is connected through the lines 151 and 152 to the gate and cathode, respectively, of the thyristor 21 thereby to fire the thyristor in response to a pulse from the transformer 147 in a well-known manner.

While the current-sensing means including the transistor 59 has been described as being primarily a current limiting or overload device, it will be apparent that it can equally as well serve as a constant current-regulating device, with or without the voltage-regulating device 87, by adjusting the set or threshold point of transistor 59 through potentiometer 72. The set point of voltage sensor 87, if used, can be varied by potentiometer 100. The power supply 8 can thus be operated as a constant voltage source with overload protection, as a constant current source, or as a constant voltage with crossover to a constant current source. As used herein, the term "set point" means the base voltage at which an amplifying transistor either turns on or turns off.

In operation, the high-leakage reactance transformer 13 provides a peak current-limiting means for the pulse provided by the thyristor 21 and the stored energy in the transformer assists in positive commutation of the transistor during the declining side of the AC input wave form. The capacitance 27 positioned at the output side of thyristor 21 not only serves as a filter but assures positive commutation of the thyristor by applying reverse bias on the thyristor and the diodes of bridge 19 during the declining side of the AC input waveform. While a high-leakage reactance transformer on the input side of the power supply is preferable, it may, under at least some applications of the invention, be replaced by a high-reactance inductance or choke.

The operation of the pulse width timing circuit for the thyristor 21 is as follows. Considering junction or node 50 as a reference point, the pulsating DC from bridge rectifier 35 in conjunction with the zener 46 provides a clipped DC waveform at the junction or node 56 as illustrated in FIG. 2a of the drawing. As also shown in FIG. 2a, the waveform at node 56 produces a spike 153 near the half cycle phase reversal of the pulsating DC which is positive with respect to the line or voltage node 41. This spike triggers the SCR 114 into conduction through the junction 54 and diode 120. Conduction of SCR 114 lowers the potential at junction or node 115 by the drop through resistance 116 to a voltage that is positive with respect to line 41 but is negative with respect to the emitter 144 of transistor 137 thereby to render the transistor 137 nonconductive. At the same time, the capacitance 130 begins to charge at a constant rate through the resistance 129 as illustrated by the line 115 in FIG. 2b. When the charge on capacitance 130 reaches a value 154 (FIG. 2b) dependent upon the control signal voltage on base B2 of unijunction 112, the unijunction 112 fires into the capacitance 141 and produces a negative pulse through resistance 139 and line 138 to the anode of SCr 114 thereby positively to reset or turn off the SCR 114. At the same time, the capacitance 130 discharges through resistance 116 so as to be at zero potential at the initiation of the next timing cycle. UPon turnoff or nonconduction of SCR 114, the node voltage at junction 115 rapidly rises to the node or voltage of line 44 and junction 117 thereby to render the transistor 137 again conductive. This positive-going pulse on the base 136 of transistor 137 provides a square wave pulse on the thyristor 21 through the pulse transformer 147 as illustrated by the waveform on collector 145 in FIG. 2c, thereby effecting positive turn-on of thyristor 21. The variation of the supply voltage on line 44 also provides preregulation of the timing circuit.

Although certain modifications of the power supply have been previously described, it will be evident that other alterations, modifications and changes may be made within the scope of the appended claims.

What we claim is:

1. In a regulated DC power supply, the combination comprising input terminal means adapted for connection to an AC source of supply, a high-leakage reactance transformer having the primary connected to said input terminal means and the secondary connected directly to rectifying bridge means, load lines connected directly to the DC output of said bridge means, thyristor switching means connected in one of said load lines, capacitive means connected across said load lines on the load side of said thyristor switching means to assure, in conjunction with the high-leakage reactance, positive commutation of the thyristor switching means, so as to provide pulse width modulation control, control circuitry means including unijunction timing circuit means, voltage error sensing means, current-sensing means, and intermediate amplifying means responsive to signals from said voltage error sensing means and said current sensing means, and means for connecting the output of said intermediate amplifying means to said unijunction timing circuit means to control the firing angle of the unijunction circuit means, said unijunction timing circuit means including circuit means for effecting interbase voltage control of the unijunction.

2. A combination as defined in claim 1 which further includes a pulse-forming means electrically isolated from said timing circuit means for triggering said thyristor switching means, and means connected to said timing circuit means for controlling operation of said pulse-forming means.

3. In a regulated DC power supply, the combination comprising input terminal means adapted for connection to an AC source of supply, a high-reactance inductive means connected to said terminal means, a rectifying bridge means connected to said terminal means through said inductive means, load lines connected to the DC output terminals of said bridge means, a thyristor switching means serially connected in one of said load lines, a capacitive means connected across said load lines on the load side of said thyristor switching means, pulse width modulation control circuitry means for controlling the firing angle of said thyristor switching means, said inductive means providing a peak current limiting means for the pulse provided by the thyristor switching means, capacitive means connected across said load lines on the load side of said thyristor switching means, said capacitive means in conjunction with said inductive means assuring positive commutation of the thyristor switching means, means for sensing an output of said power supply, a timing circuit means including a unijunction transistor fired by base voltage control, said timing circuit means including an SCR, a resistance and capacitance connected in series, circuit means for charging said capacitance through said resistance upon firing of said SCR and discharging the capacitance upon turnoff of the SCR, means connecting said capacitance to the emitter of said unijunction transistor, means for controlling the firing of said unijunction transistor in response to signals from said sensing means, and pulse-forming means electrically isolated from said timing circuit means for triggering said thyristor switching means upon firing of said unijunction transistor.

4. A combination as defined in claim 3 in which said timing circuit means further includes means for generating a pulsating DC voltage timed to the half wave frequency of said AC source of input power, and means pulsed by said pulsating voltage for periodically triggering said SCR in timed relationship with the input AC.

5. A combination as defined in claim 4 wherein said pulse-triggering means for said SCR includes a reference voltage which varies with the input AC voltage thereby to vary the timing of aid pulse and provide preregulation of the timing circuit means.

6. A combination as defined in claim 3 in which said timing circuit means further includes means for periodically applying a triggering pulse to said SCR to render the SCR conductive in timed relationship with said AC source of input power, and means for positively resetting said SCR to a nonconductive condition upon each firing of said unijunction transistor.

7. A combination as defined in claim 6 in which the output circuit of said unijunction transistor includes a capacitance, means including a resistance connects the junction of said unijunction transistor and said capacitance with the anode of said SCR, and circuit means connected to said anode provides a control connection to the base of a transistor included in said thyristor pulse forming means.

UNITED STATES PATENT OFFICE
CERTIFICATE OF CORRECTION

Patent No. 3,597,675          Dated August 3, 1971

Inventor(s) John E. Peek

It is certified that error appears in the above-identified patent and that said Letters Patent are hereby corrected as shown below:

Column 1, line 72, comma (,) omitted after "d.c.".
Column 4, line 38, "SCr" should be --SCR--; Column 4, line 41, "UPon" should be --Upon--; Column 4, line 62, "directly" should be deleted. Column 6, line 15, "aid" should be --said--.

Signed and sealed this 2nd day of May 1972.

(SEAL)
Attest:

EDWARD M. FLETCHER, JR.          ROBERT GOTTSCHALK
Attesting Officer                Commissioner of Patents